United States Patent
Han et al.

(10) Patent No.: US 10,084,332 B2
(45) Date of Patent: Sep. 25, 2018

(54) METHOD AND APPARATUS FOR CHARGING USING MULTIPLE ENERGY SOURCE

(71) Applicant: Samsung Electronics Co., Ltd., Suwon-si, Gyeonggi-do (KR)

(72) Inventors: Yun-Hui Han, Suwon-si (KR); Chul-Woo Park, Suwon-si (KR); Kisun Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 14/952,002

(22) Filed: Nov. 25, 2015

(65) Prior Publication Data

US 2016/0156203 A1 Jun. 2, 2016

(30) Foreign Application Priority Data

Nov. 27, 2014 (KR) .................. 10-2014-0167438

(51) Int. Cl.
*H02J 7/00* (2006.01)
*H02J 7/35* (2006.01)

(52) U.S. Cl.
CPC ............ *H02J 7/007* (2013.01); *H02J 7/0055* (2013.01); *H02J 7/35* (2013.01)

(58) Field of Classification Search
None
See application file for complete search history.

(56) References Cited

U.S. PATENT DOCUMENTS

| 4,186,336 | A  | * | 1/1980 | Weinberg | B64G 1/428 307/59 |
| 6,288,522 | B1 | * | 9/2001 | Odaohara | H02J 7/0055 320/137 |
| 7,804,273 | B2 | * | 9/2010 | Popescu-Stanesti | H02J 7/0018 320/108 |
| 9,300,153 | B2 | * | 3/2016 | Fujiyama | H02J 7/0052 |
| 9,543,786 | B2 | * | 1/2017 | Yung | H02J 7/0021 |
| 9,553,449 | B2 | * | 1/2017 | Tajiri | H02J 1/00 |
| 2009/0160396 | A1 | | 6/2009 | Shyu et al. | |

(Continued)

FOREIGN PATENT DOCUMENTS

| JP | 2009-153372 A | 7/2009 |
| JP | 2011-97170 A | 5/2011 |
| KR | 10-0742498 B1 | 7/2007 |

(Continued)

OTHER PUBLICATIONS

English Translation of JP2011097170 (Foreign Patent Document #4 on IDS filed Nov. 25, 2015).*

*Primary Examiner* — Leigh Garbowski
(74) *Attorney, Agent, or Firm* — Jefferson IP Law, LLP

(57) ABSTRACT

A method of performing a charging function by using different types of energy sources and an electronic device thereof are provided. The electronic device includes different types of circuits configured to acquire different types of energy sources, and a processor configured to determine an energy source for charging among the different types of energy sources based on respective current values for the different types of energy sources, and control the determined energy source for charging so as to be used in battery charging of the electronic device or in a system operation of the electronic device.

2 Claims, 11 Drawing Sheets

(56) References Cited

U.S. PATENT DOCUMENTS

2012/0187897 A1* 7/2012 Lenk .................... H01M 10/44
                                                   320/101
2012/0299529 A1* 11/2012 Guo ......................... H02J 7/35
                                                   320/101

FOREIGN PATENT DOCUMENTS

KR  10-2012-0068581 A   6/2012
KR  10-2014-0062353 A   5/2014

* cited by examiner

METHOD AND APPARATUS FOR CHARGING USING MULTIPLE ENERGY SOURCE

CROSS-REFERENCE TO RELATED APPLICATION(S)

This application claims the benefit under 35 U.S.C. § 119(a) of a Korean patent application filed on Nov. 27, 2014 in the Korean Intellectual Property Office, and assigned Serial number 10-2014-0167438, the entire disclosure of which is hereby incorporated by reference.

TECHNICAL FIELD

The present disclosure relates to a method and an apparatus for performing a charging function by using different types of energy sources in an electronic device.

BACKGROUND

With the rapid development of an electronic device, such as a smart phone, a tablet personal computer (PC), and the like, an electronic device capable of wireless voice telephony and information exchange has become a necessity of everyday life. The electronic device was recognized as a portable device capable of simple wireless telephony when it was first distributed. However, with the introduction of a related technique and wireless Internet, the electronic device is developed into a multimedia device for performing functions, such as scheduling, games, remote controls, image capturing, and the like, to satisfy a user's demand.

As such, since various functions are used in one electronic device, a battery usage time and a usage capacity of the electronic device have been significantly increased. The increase in the battery usage time and the usage capacity leads to an increase in a battery consumption amount, and thus various methods of charging the battery of the electronic device are provided. One example of the battery charging method includes a method of using a solar energy source and a light energy source.

In the battery charging method of the related art using the solar energy source and the light energy source, a system responsive to the solar energy source is used so that the solar energy source and the light energy source (i.e., light energy sources except for the solar energy source) which is output from an indoor light are used for battery charging.

When both of a solar energy source and a light energy source which is output from an indoor light are used for battery charging by using a system responsive to the solar energy source, since the system is optimized to respond to the solar energy source, an efficiency of the battery charging deteriorates inevitably when using the light energy source output from the indoor light.

Therefore, a need exists for a method and an apparatus for increasing a charging efficiency in both of a case where a battery is charged by using the solar energy source and a case where the battery is charged by using the light energy source output from the indoor light.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for increasing a charging efficiency in both of a case where a battery is charged by using the solar energy source and a case where the battery is charged by using the light energy source output from the indoor light.

In addition, when an acquired energy source amount is a significantly small amount, the acquired energy source is mostly consumed when driving a regulator, which leads to a decrease in a charging efficiency. Another aspect of the present disclosure is to provide a method and an apparatus for increasing a charging efficiency without having to process an acquired energy source by controlling a delivery path for the acquired energy source if an amount of the acquired energy source in an electronic device is less than or equal to a threshold.

Another aspect of the present disclosure is to provide a method and an apparatus for charging a battery by using various different energy sources other than a solar energy source and a light energy source output from an indoor light in an electronic device.

In accordance with an aspect of the present disclosure, an electronic device is provided. The electronic device includes different types of circuits for acquiring different types of energy sources, and a processor configured to determine an energy source for charging among the different types of energy sources based on respective current values for the different types of energy sources, and control the determined energy source for charging so as to be used in battery charging of the electronic device or in a system operation of the electronic device.

In accordance with another aspect of the present disclosure, a method of an electronic device is provided. The method includes acquiring different types of energy sources, determining an energy source for charging among the different types of energy sources based on respective current values for the different types of energy sources, and allowing the determined energy source for charging so as to be used in battery charging of the electronic device or in a system operation of the electronic device.

In accordance with another aspect of the present disclosure, an electronic device is provided. The electronic device includes different types of circuits for acquiring different types of energy sources, an illumination sensor for measuring an illumination value, and a processor configured to determine an energy source for charging among the different types of energy sources based on the illumination value measured from the illumination sensor, and control the determined energy source for charging so as to be used in battery charging of the electronic device or in a system operation of the electronic device.

In accordance with another aspect of the present disclosure, a method of an electronic device is provided. The method includes acquiring different types of energy sources, measuring an illumination value, determining an energy source for charging among the different types of energy sources based on the measured illumination value, and allowing the determined energy source for charging so as to be used in battery charging of the electronic device or in a system operation of the electronic device.

In accordance with another aspect of the present disclosure, an electronic device is provided. The electronic device includes a battery, a circuit for acquiring an energy source, a first path having a regulator and receiving current from the circuit, a second path configured to receive current from the circuit, and a processor configured to control the energy source to be used in battery charging of the electronic device or in a system operation of the electronic device by using any one of the first path and the second path based on a current value for the energy source and a current value consumed in the regulator.

In accordance with another aspect of the present disclosure, a method of an electronic device is provided. The method includes acquiring an energy source, determining a first current value consumed in a regulator for performing a charging function, determining a second current value for the energy source and one path among a plurality of paths so that the energy source is used in battery charging of the electronic device or in a system operation of the electronic device based on the second current value, and allowing the energy source to be used in the battery charging of the electronic device or in the system operation of the electronic device through the determined path, wherein the plurality of paths includes a first path having the regulator and a second path not having the regulator.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
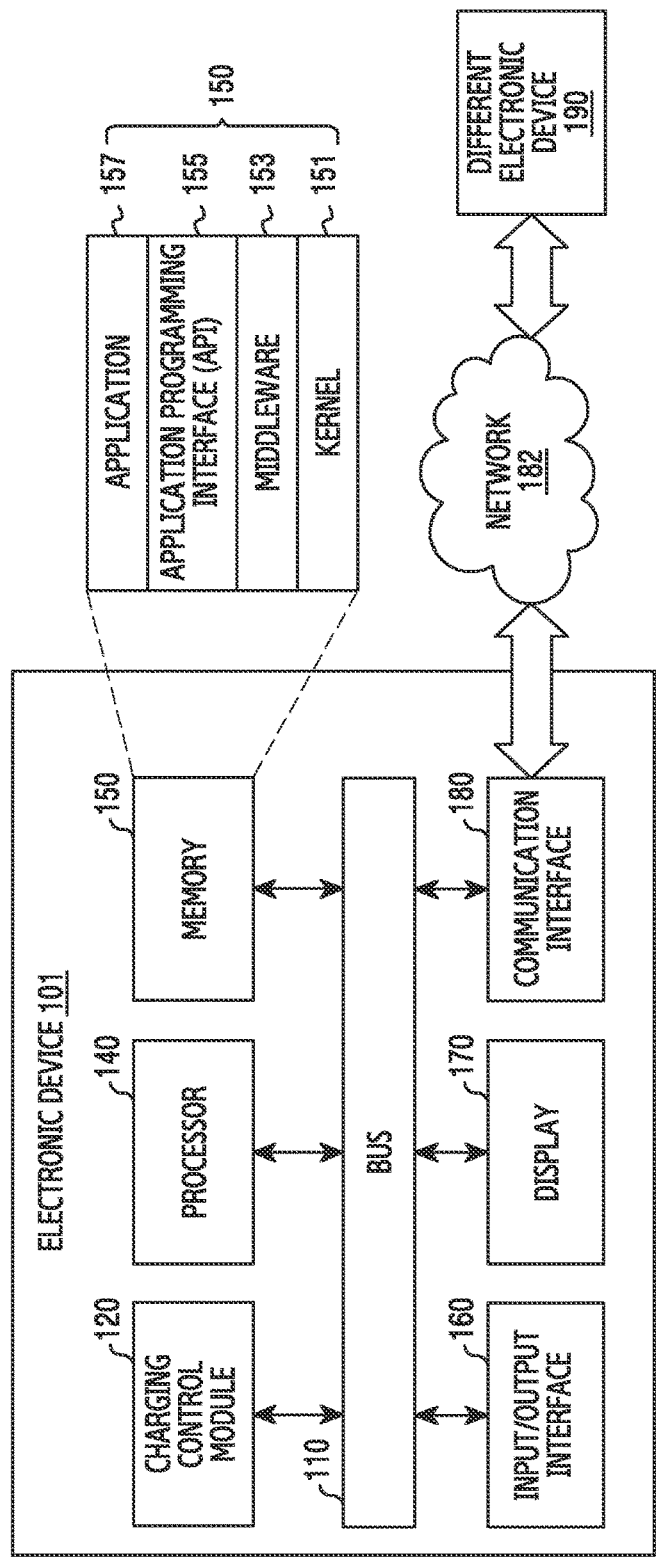
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "have," "may have," "include," and "may include", as used herein, indicate the presence of corresponding features (e.g., elements, such as numerical values, functions, operations, parts, and the like), and do not preclude the presence of additional features.

The terms "A or B," "at least one of A and B," or "at least one of A and B", as used herein, include all possible combinations of items enumerated with them. For example, "A or B," "at least one of A and B," or "at least one of A and B" indicates (1) including at least one A, (2) including at least one B, or (3) including both at least one A and at least one B.

The terms, such as "first" and "second", as used herein, may modify various elements regardless of an order and/or importance of the corresponding elements, and does not limit the corresponding elements. These terms may be used for the purpose of distinguishing one element from another element. For example, a first user device and a second user device may indicate different user devices regardless of their order or importance. For example, a first element may be referred to as a second element without departing from the scope of embodiments of the present disclosure, and similarly, a second element may be referred to as a first element.

It will be understood that, when an element (e.g., a first element) is "(operatively or communicatively) coupled with/to" or "connected to" another element (e.g., a second element), the first element may be directly coupled with/to the second element, or there may be an intervening element (e.g., a third element) between the first element and the second element. To the contrary, it will be understood that, when an element (e.g., the first element) is "directly coupled with/to" or "directly connected to" another element (e.g., the second element), there is no intervening element (e.g., the third element) between the first element and the second element.

The expression "configured to (or set to)", as used herein, may be replaced with "suitable for," "having the capacity to," "designed to," "adapted to," "made to," or "capable of", according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing at least one software program stored in a memory device.

The terms used in the various embodiments of the present disclosure are just for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined in the various embodiments of the present disclosure. According to circumstances, even terms defined in the various embodiments of the present disclosure should not be interpreted as excluding other various embodiments of the present disclosure.

An electronic device, according to various embodiments of the present disclosure, may include at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a mobile medical machine, a camera, or a wearable device (e.g., smart glasses, a head mounted device (HMD), electronic clothing, an electronic bracelet, an electronic necklace, an electronic appcessory, electronic tattoos, a smart mirror, a smart watch, and the like).

According to various embodiments of the present disclosure, the electronic device may be a smart home appliance. For example, the smart home appliance may include at least one of a television, a digital versatile disc (DVD) player, a stereo, a refrigerator, an air conditioner, a cleaner, an oven, a microwave oven, a washing machine, an air cleaner, a set-top box, a home automation control panel, a security control panel, a television (TV) box, a game console, an electronic dictionary, an electronic key, a camcorder, or an electronic album.

According to another embodiment of the present disclosure, the electronic device may include at least one of various medical machines (e.g., various portable medical measurement devices (a glucose monitor, a heart rate monitor, a blood pressure measuring device, a thermometer, and the like), magnetic resonance angiography (MRA), magnetic resonance imaging (MRI), computerized tomography (CT), a tomograph, an ultrasound machine, and the like), a navigation device, a global positioning system (GPS) receiver, an event data recorder (EDR), a flight data recorder (FDR), an automotive infotainment device, electronic equipment for ship (e.g., a navigation equipment for a ship, a gyro compass, and the like), avionics, a security device, a head unit for vehicles, an industrial or home robot, an automated teller machine (ATM) of a financial institution, point of sales (POS) device of a store, or internet of things (IoT) (e.g., a lamp, various sensors, an electric or gas meter, a sprinkler, a fire alarm, a thermostat, a streetlamp, a toaster, an exercising machine, a hot water tank, a heater, a boiler, and the like).

According to an embodiment of the present disclosure, the electronic device may include at least one of a part of furniture or a building/a structure, an electronic board, an electronic signature-receiving device, a projector, and various measurement devices (e.g., devices for measuring water, power, gas, radio waves, and the like). The electronic device, according to various embodiments of the present disclosure, may be one or a combination of at least one of the above-described devices. In addition, the electronic device, according to various embodiments of the present disclosure, may be a flexible electronic device. In addition, the electronic device, according to various embodiments of the present disclosure, is not limited to the above-described devices, and may include a new electronic device accompanied by technology development.

The term "user", as used herein, may refer to a person who uses the electronic device or a device that uses the electronic device (e.g., an artificial intelligence electronic device).

FIG. 1 illustrates a network environment including an electronic device according to an embodiment of the present disclosure.

Referring to FIG. 1, an electronic device 101 may include a bus 110, a charging control module 120, a processor 140, a memory 150, an input/output (I/O) interface 160, a display 170, and a communication interface 180.

The bus 110 may be a circuit for connecting the constitutional elements of the electronic device 101 and for delivering communication (e.g., a control message) between the constitutional elements of the electronic device 101.

The charging control module 120 may acquire different types of energy sources, and may perform charging by selecting a specific type of an energy source from the acquired different types of energy sources. The energy source may include a solar energy source, a wind energy source, a skin temperature energy source, a hydro energy source, and the like, which can be converted to electric energy.

According to the embodiment of the present disclosure, the charging control module 120 may acquire different types of energy sources, and may detect a current value by converting each of the acquired energy sources into current. For example, the charging control module 120 may acquire the solar energy source and the light energy source, and may convert each of the acquired solar energy source and light energy source into current, thereby detecting a current value corresponding to the solar energy source and a current value corresponding to the light energy source. Hereinafter, light energy implies light which is output from not the Sun but an electric light. According to the embodiment of the present disclosure, the charging control module 120 may compare current values detected for the different types of energy sources to select an energy source of a specific type having a greatest current value, and may use the selected energy source for battery charging of the electronic device or for a system operation of the electronic device. For example, if the result of comparing the current value corresponding to the solar energy source and the current value corresponding to the light energy source shows that the current value corresponding to the solar energy source is greatest, the charging control module 120 may use the solar energy source for the battery charging of the electronic device or for the system operation of the electronic device. For another example, if the result of comparing the current value corresponding to the solar energy source and the current value corresponding to the light energy source shows that the current value corresponding to the light energy source is greatest, the charging control module 120 may use the light energy source for the battery charging of the electronic device or for the system operation of the electronic device.

According to another embodiment of the present disclosure, the charging control module 120 may acquire different types of energy sources, and may determine an illumination value at a present location by using an illumination sensor included in the electronic device. For example, the charging control module 120 may acquire the solar energy source and the light energy source, and may determine the illumination value at the present location by using the illumination sensor included in the electronic device. The charging control module 120 may determine which type of sources are acquired more at present by the electronic device between the solar energy source and the light energy source based on the determined illumination value. For example, if the illumination value determined through the illumination sensor is greater than or equal to 5000 Lux, the charging control module 120 may determine that the electronic device is acquiring more solar energy than light energy at present. For another example, if the illumination value determined through the illumination sensor is less than or equal to 1000 Lux, the charging control module 120 may determine that the electronic device is acquiring more light energy than solar energy at present. For example, the charging control module 120 may determine a threshold illumination value based on a certain average illumination value of the solar energy source and average illumination value information of the light energy source, and may determine a type of an energy source which is being acquired more at present based on the determined threshold illumination value. The charging control module 120 may select an energy source which is being acquired more at present between the light energy source and the solar energy source, and may use the selected energy source for the battery charging of the electronic device or for the system operation of the electronic device. According to the embodiment of the present disclosure, the threshold illumination value may be determined through experiments.

According to another embodiment of the present disclosure, the charging control module 120 may determine the type of the energy source which is being acquired the most based on a current value for each energy source and an illumination value at a present location. If the illumination value at the present location is not included in a range of the illumination value corresponding to the solar energy source and is not included in a range of the illumination value corresponding to the light energy source, since it is difficult to determine the type of the energy source which is being acquired more at present based on the illumination value at the present location, the charging control module 120 may determine the type of the energy source which is being acquired more at present based on the current value for each energy source. On the other hand, if the current value for each energy source has a similar value to each other, since it is difficult to determine the type of the energy source which is being acquired more at present based on the current value, the charging control module 120 may determine the type of the energy source which is being acquired more at present based on the illumination value at the present location.

According to another embodiment of the present disclosure, the charging control module 120 may determine whether to perform charging by using the regulator or to perform the charging by not using the regulator, based on acquired consumption current of a regulator. For example, the charging control module 120 may compare the current value for the acquired energy source with the consumption current value of the regulator, and if a difference between the current value for the energy source and the consumption current value of the regulator is within a threshold range, may control the current of the acquired energy source to be provided for the battery charging of the electronic device without having to pass through the regulator or may control the current of the acquired energy source to be provided directly for the system operation of the electronic device. For example, if the current value for the acquired energy source is similar to the consumption current value of the regulator, the charging control module 120 may predict that the current for the energy source will be entirely consumed while passing through the regulator, and thus may perform the charging by delivering the current for the acquired energy source to the battery or the system of the electronic device through a path in which the regulator is not included. For another example, the charging control module 120 may compare the current value for the acquired energy source with the consumption current value of the regulator, and if the difference between the current value for the energy source and the consumption current value of the regulator is out of the threshold range, may control the current of the acquired energy source to be provided to the battery of the system of the electronic device through the regulator. For example, if the current value of the acquired energy source is greater than the consumption current value of the regulator by more than a threshold, the charging control module 120 may predict that remaining current for charging will be sufficient even if the current passes through the regulator for the energy source and thus may deliver the current for the acquired energy source to the battery through a path in which the regulator is included to perform the charging, or may provide the current for the acquired energy source to the system of the electronic device.

The processor 140 may receive an instruction from the different constitutional elements (e.g., the charging control module 120, the memory 150, the I/O interface 160, the display 170, the communication interface 180, and the like) of the electronic device 101 through the bus 110 to interpret the received instruction and to execute an arithmetic operation or data processing based on the interpreted instruction.

The memory 150 may store an instruction or data received from the processor 140 or the different constitutional elements (e.g., the charging control module 120, the memory 150, the I/O interface 160, the display 170, the communication interface 180, and the like) or generated from the processor 140 or the different constitutional elements. The memory 150 may include programming modules, such as a kernel 151, a middleware 153, an application programming interface (API) 155, an application 157, and the like. Herein, each of the aforementioned programming modules may consist of software, firmware, or hardware entities or may consist of at least two or more combinations thereof.

The I/O interface 160 may deliver an instruction or data input from a user through an input device (e.g., a sensor, a keyboard, or a touch screen) to the charging control module 120, the processor 140, the memory 150, or the communication interface 180 through the bus 110. For example, the I/O interface 160 may provide data regarding a user's touch input through the touch screen to the processor 140.

The display 170 may display a variety of information (e.g., multimedia data, text data, and the like) to the user. For example, the display 170 may display an instruction or data received from the charging control module 120, the processor 140, the memory 150, and the communication interface 180 through the bus 110.

The communication interface 180 may connect communication between the electronic device 101 and an external device (e.g., a different electronic device 190). For example, the communication interface 180 may be connected to a network 182 through wireless communication to communicate with the different electronic device 190. The wireless communication may include at least one of, for example, WiFi, Bluetooth (BT), BT low energy (BLE), near field communication (NFC), satellite communication (e.g., GPS), and cellular communication (e.g., long term evolution (LTE), LTE-advanced (LTE-A), code division multiple access (CDMA), wideband CDMA (WCDMA), universal mobile telecommunications system (UMTS), wireless broadband (WiBro), global system for mobile communication (GSM), and the like).

According to an embodiment of the present disclosure, a protocol (e.g., a transport layer protocol, a data link layer protocol, or a physical layer protocol) for communication between the electronic device 101 and the different electronic device 190 may be supported in any one of the application, API, middleware, kernel, or communication interface 180 included in the memory 150.

Figure 2:
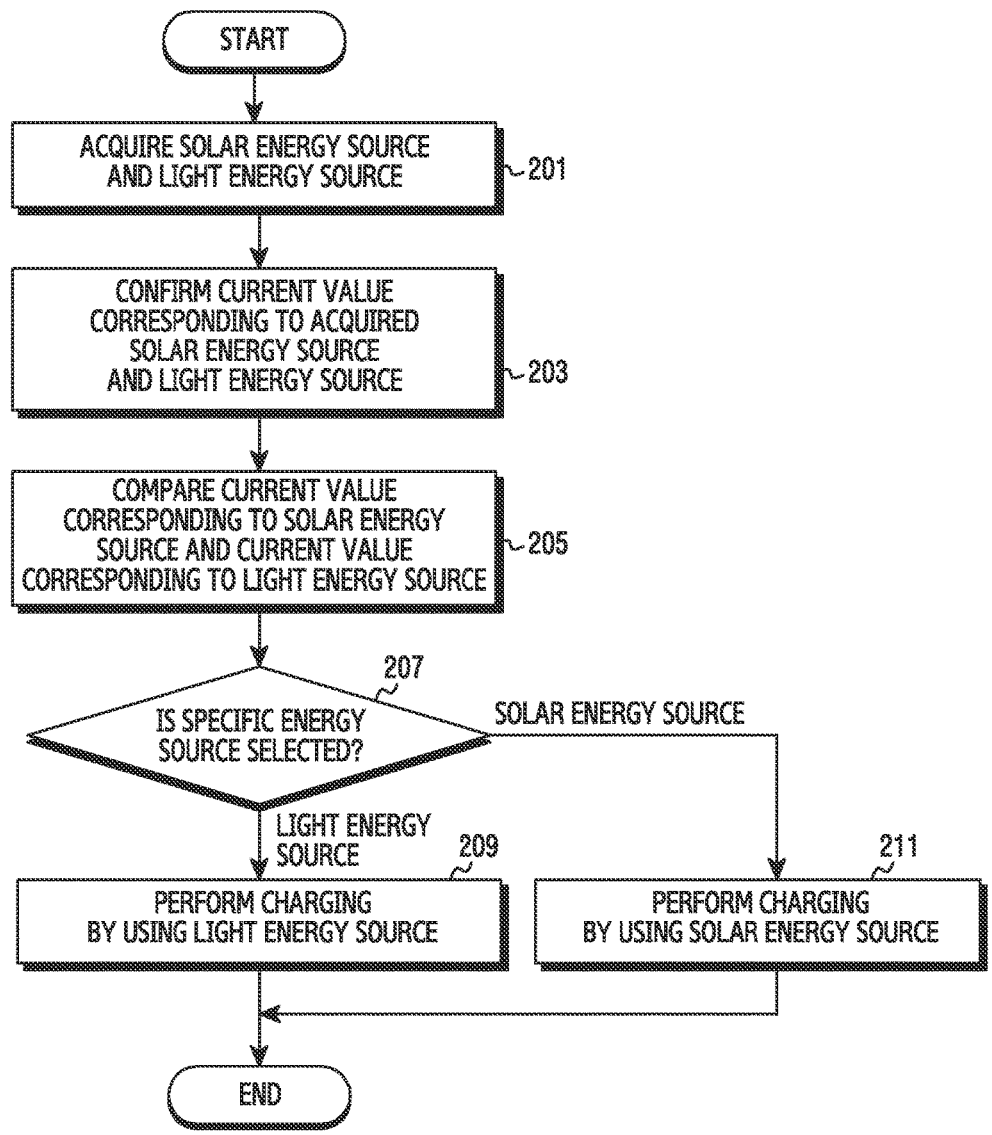
FIG. 2 illustrates a procedure of determining an energy source for charging an electronic device based on a current value for the energy source in the electronic device according to an embodiment of the present disclosure.

FIG. 2 illustrates a procedure of determining an energy source for charging an electronic device based on a current value for the energy source in the electronic device according to an embodiment of the present disclosure.

Referring to FIG. 2, in operation 201, the electronic device (e.g., the electronic device 101) may acquire a solar energy source and a light energy source. According to the embodiment of the present disclosure, the electronic device may include a device capable of acquiring the solar energy source in response to sunlight and a device capable of acquiring the light energy source in response to light. More particularly, each device capable of acquiring the energy source may be independently included according to an energy source type, and a plurality of devices capable of acquiring the same type of energy sources may be included in a serial or parallel shape. For another example, the device capable of acquiring the solar energy source and the device capable of acquiring the light energy source may be included as one device.

Figure 3A:
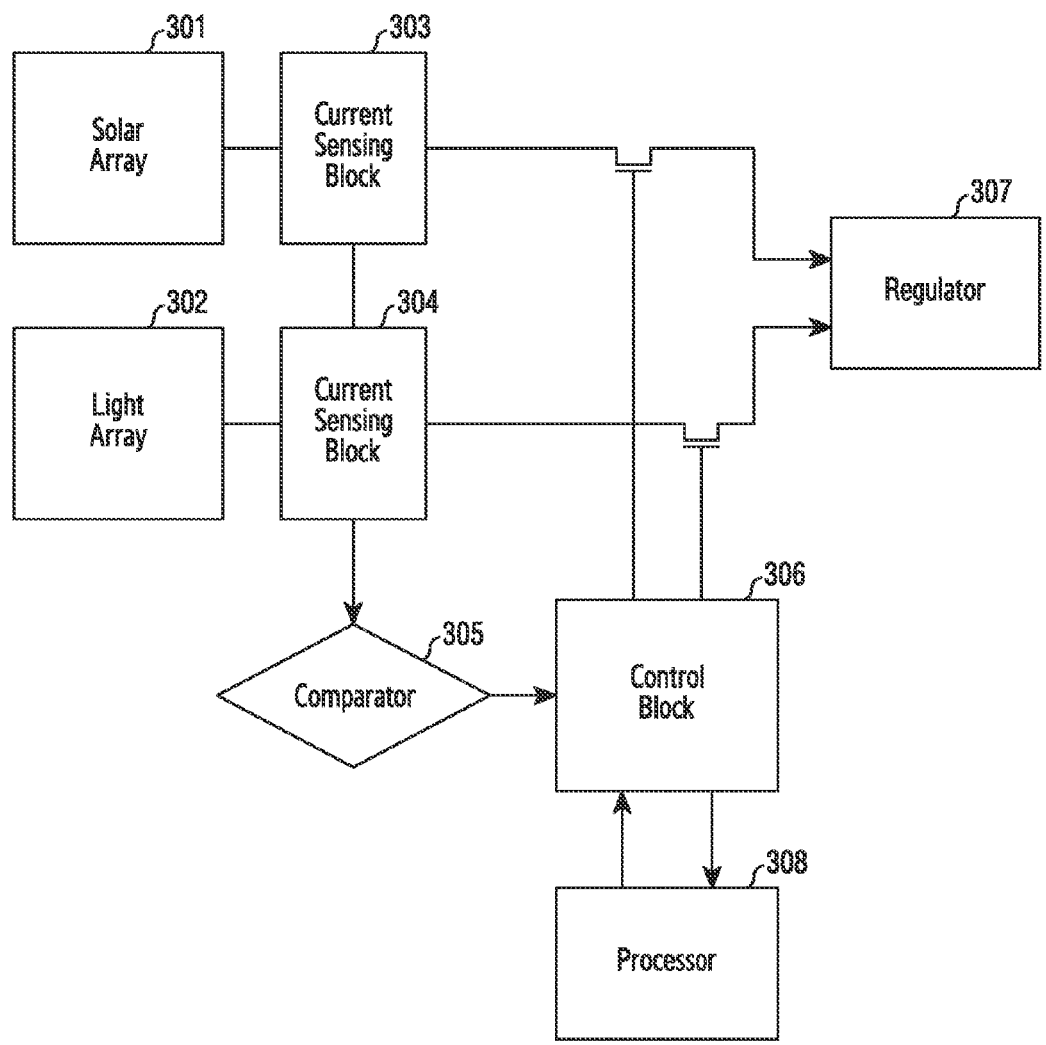
FIGS. 3A and 3B illustrate a signal flow of determining an energy source for charging an electronic device based on a current value for the energy source in the electronic device according to an embodiment of the present disclosure.
Figure 3B:
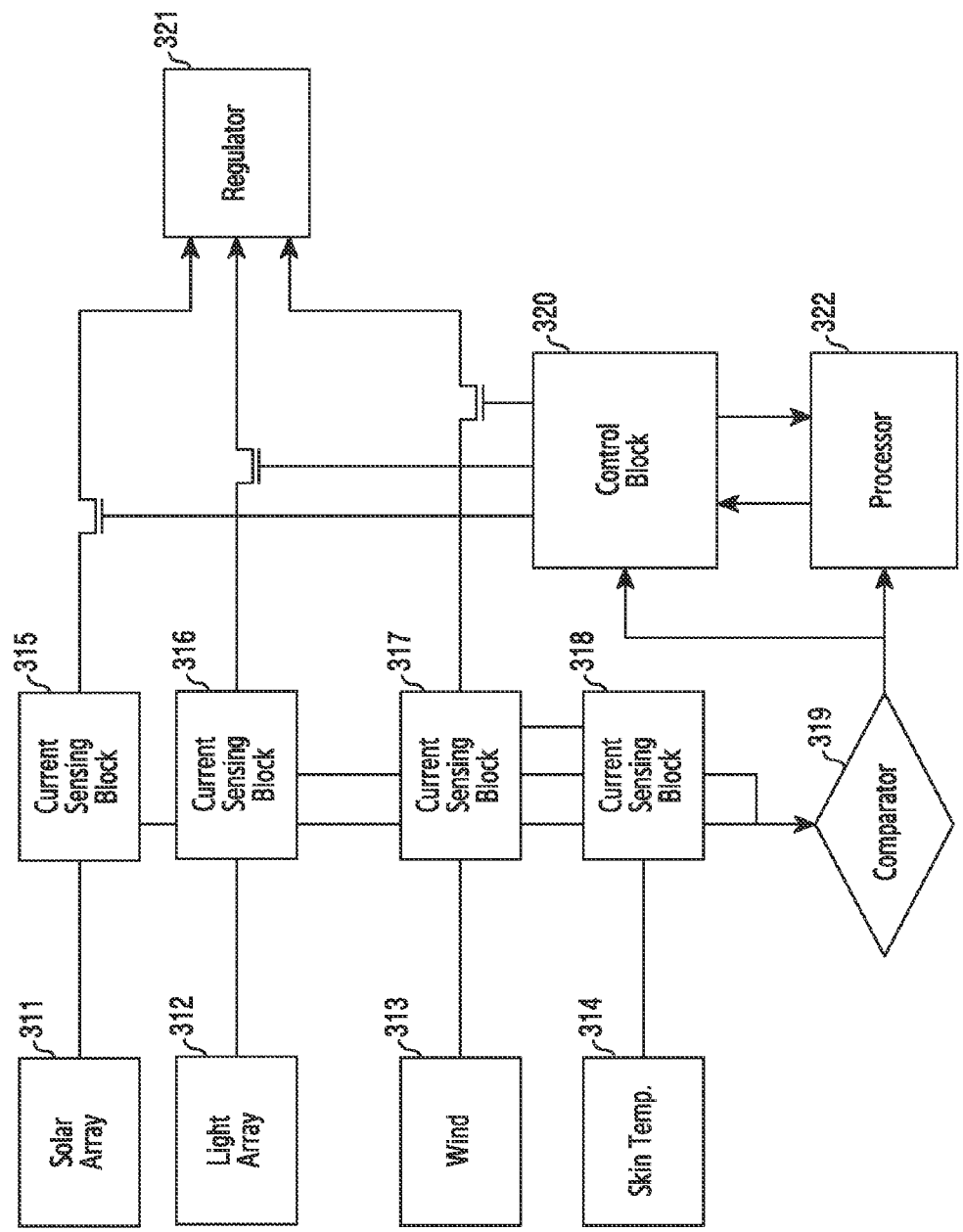

FIGS. 3A and 3B illustrate a signal flow of determining an energy source for charging an electronic device based on a current value for the energy source in the electronic device according to an embodiment of the present disclosure.

For example, referring to FIG. 3A, the electronic device may acquire each of the solar energy source and the light energy source through a device 301 capable of acquiring the solar energy source and a device 302 capable of acquiring the light energy source.

In operation 203, the electronic device may confirm a current value corresponding to the acquired solar energy source and light energy source. For example, as shown in FIG. 3A, the electronic device may convert the solar energy source and the light energy source to current corresponding to respective sources through the device 301 capable of acquiring the solar energy source and the device 302 capable of acquiring the light energy source. In addition, as shown in FIG. 3A, the electronic device may detect current output from the device 301 capable of acquiring the solar energy source and the device 302 capable of acquiring the light energy source to acquire a current value through current sensors 303 and 304.

In operation 205, the electronic device may compare the current value corresponding to the solar energy source and the current value corresponding to the light energy source.

In operation 207, the electronic device may select a specific energy source according to the comparison result. More specifically, the electronic device may compare the current value corresponding to the solar energy source and the current value corresponding to the light energy source, and may select the specific energy source according to which energy source shows a greater current value between the current value corresponding to the solar energy source and the current value corresponding to the light energy source. For example, as shown in FIG. 3A, the electronic device may deliver the current values confirmed respectively from the current sensors 303 and 304 to a comparator 305, and if the result of comparing the respective current values shows that the current value corresponding to the solar energy source is greater than the current value corresponding to the light energy source, may select the solar energy source. For another example, as shown in FIG. 3A, the electronic device may deliver the current values confirmed respectively from the current sensors 303 and 304 to the comparator 305, and if the result of comparing the respective current values shows that the current value corresponding to the light energy source is greater than the current value corresponding to the solar energy source, may select the light energy source.

If the light energy source is selected, the electronic device may perform charging by using the light energy source in operation 209. For example, as shown in FIG. 3A, if the result of comparing the respective current values shows that the current value corresponding to the light energy source is greater than the current value corresponding to the solar energy source, the electronic device may control the controller 306 to open a path of the light energy source, and may allow the light energy source to be used in battery charging of the electronic device or in a system operation of the electronic device through a regulator 307. Herein, the regulator 307 may be a charging integrated circuit (IC) for controlling an energy source to be used in the battery charging or to be used in the system operation of the electronic device. Although the regulator 307 is illustrated as one block in the present disclosure for convenience of explanation, the regulator 307 may be a block including a switch and a plurality of constitutional elements. In addition, according to the embodiment of the present disclosure, the regulator 307 may use a well-known maximum power point tracking (MPPT) algorithm to acquire energy. If the solar energy source is selected, the electronic device may perform charging by using the solar energy source in operation 211. For example, as shown in FIG. 3A, if the result of comparing the respective current values shows that the current value corresponding to the solar energy source is greater than the current value corresponding to the light energy source, the electronic device may control the controller 306 to open a path of the solar energy source, and may allow the solar energy source to be used in the battery charging of the electronic device or in the system operation of the electronic device through the regulator 307.

According to the embodiment of the present disclosure, the electronic device may allow charging based on a specific energy source to be on/off under a user control. For example, if a user of the electronic device intends to cut off charging based on the solar energy source, as shown in FIG. 3A, the electronic device may control a controller 306 through a processor 308 included therein to cut off a path of the solar energy source. For another example, if the user of the electronic device intends to cut off charging based on the light energy source, as shown in FIG. 3A, the electronic device may control the controller 306 through the processor 308 included therein to cut off a path of the light energy source.

Although it is described that charging is performed by using one energy source between the solar energy source and the light energy source for convenience of explanation, the present disclosure is not limited thereto. Therefore, the charging may also be performed by using one energy source among a solar energy source, a wind energy source, a skin temperature energy source, a hydro energy source, and the like, which can be converted to electric energy.

For example, referring to FIG. 3B, the electronic device may acquire current corresponding to a solar energy source, a light energy source, a wind energy source, and a skin temperature energy source through a device 311 capable of acquiring the solar energy source, a device 312 capable of acquiring the light energy source, a device 313 capable of acquiring the wind energy source, and a device 314 capable of acquiring the skin temperature energy source. The electronic device may detect current corresponding to each energy source through current sensors 315 to 318 to confirm a current value for each corresponding energy source. The electronic device may compare each current value through a comparator 319 to confirm an energy source indicating a greatest current value. For example, if the result of comparing the current values shows that a current value corresponding to the solar energy source is a greatest current value, as shown in FIG. 3B, the electronic device may control a controller 320 to open a path of the solar energy source, and may allow the solar energy source to be used in charging through a regulator 321. For another example, if the result of comparing the current values shows that a current value corresponding to the light energy source is a greatest current value, as shown in FIG. 3B, the electronic device may control the controller 320 to open a path of the light energy source, and may allow the light energy source to be used in charging through the regulator 321. For another example, if the result of comparing the current values shows that a current value corresponding to the wind energy source is a greatest current value, as shown in FIG. 3B, the electronic device may control the controller 320 to open a path of the wind energy source, and may allow the wind energy source to be used in charging through the regulator 321. For another example, if the result of comparing the current values shows that a current value corresponding to the skin temperature energy source is a greatest current value, as shown in FIG. 3B, the electronic device may control the controller 320 to open a path of the skin temperature energy source, and may allow the skin temperature energy source to be used in charging through the regulator 321. In addition, according to the embodiment of the present disclosure, the electronic device may control the controller 320 through a processor 322 included therein to allow charging based on a specific energy source to be on/off. Herein, the regulator 321 may be a charging IC for controlling the energy source to be used in battery charging or for controlling the energy source to be used in a system operation of the electronic device. Although the regulator 321 is illustrated as one block in the present disclosure for convenience of explanation, the regulator 321 may be a block including a switch or a plurality of constitutional elements. In addition, according to the embodiment of the present disclosure, the regulator 321 may use a well-known MPPT algorithm to acquire energy.

Figure 4:
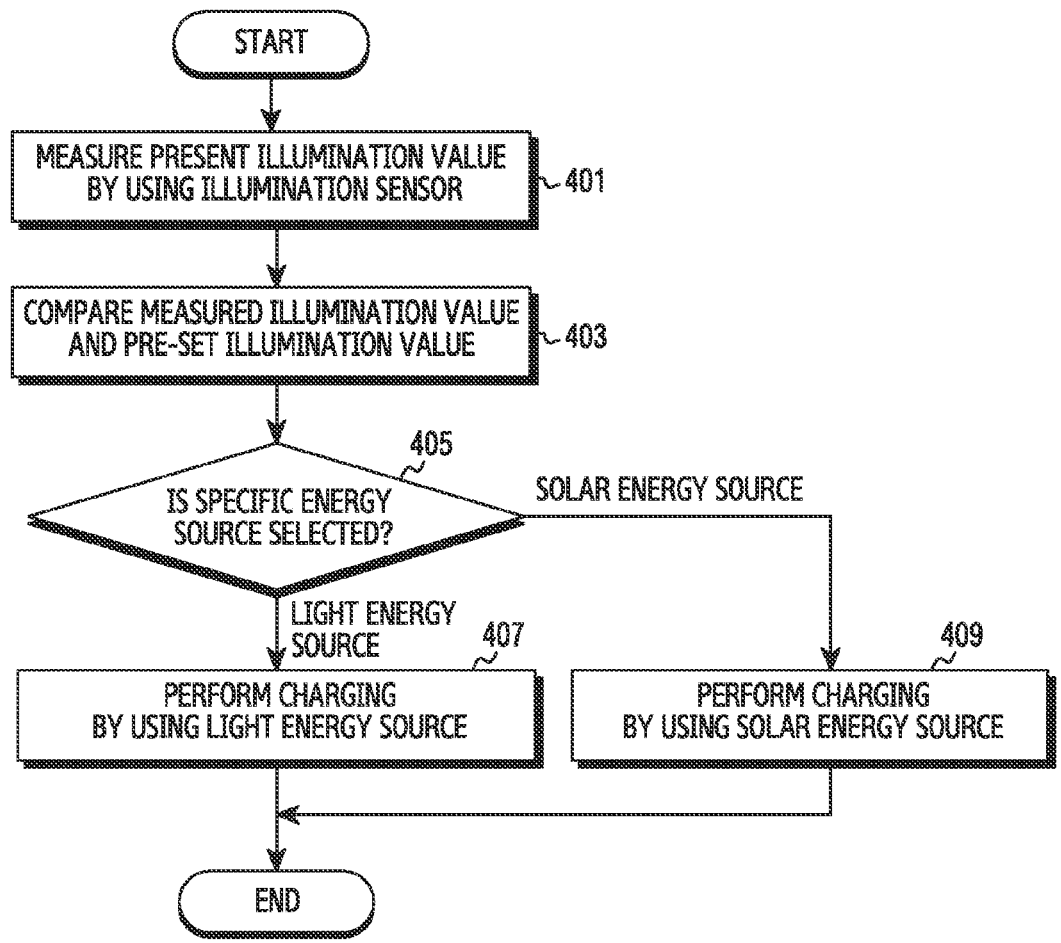
FIG. 4 illustrates a procedure of determining an energy source for charging an electronic device based on an illumination value in the electronic device according to an embodiment of the present disclosure.
Figure 5:
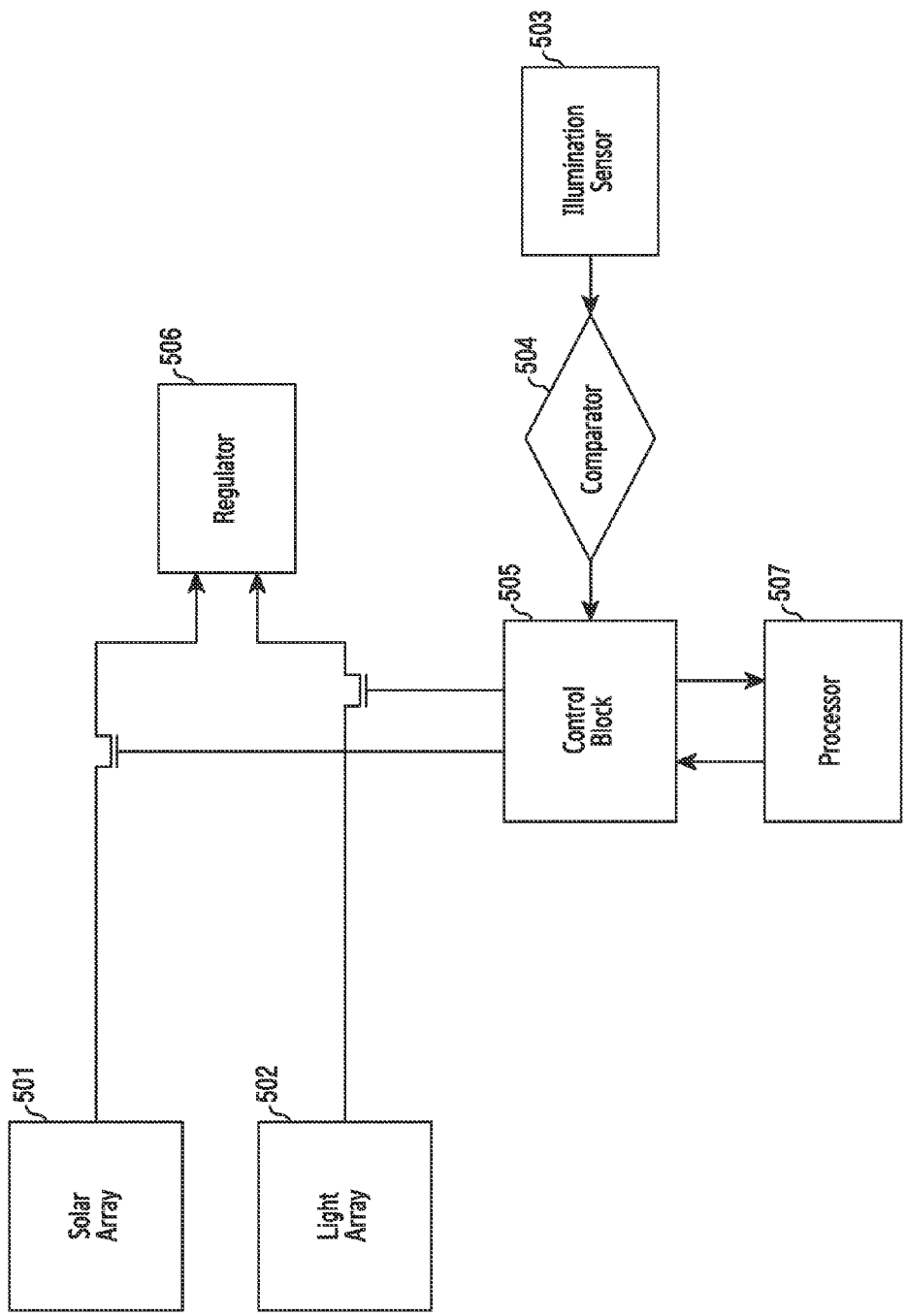
FIG. 5 illustrates a signal flow of determining an energy source for charging an electronic device based on an illumination value in the electronic device according to an embodiment of the present disclosure.

FIG. 4 illustrates a procedure of determining an energy source for charging an electronic device based on an illumination value in the electronic device according to an embodiment of the present disclosure. FIG. 5 illustrates a signal flow of determining an energy source for charging an electronic device based on an illumination value in the electronic device according to an embodiment of the present disclosure.

Referring to FIGS. 4 and 5, in operation 401, the electronic device may measure a present illumination value through an illumination sensor. For example, as shown in FIG. 5, the electronic device may measure an ambient illumination value of the electronic device through an illumination sensor 503 included in the electronic device.

In operation 403, the electronic device may compare the measured illumination value and a pre-set illumination value. More specifically, the electronic device may determine whether the electronic device is located in an indoor environment or an outdoor environment according to whether the measured illumination value is similar to an illumination value indicated by a solar energy source or an illumination value indicated by a light energy source. For example, the electronic device may transmit the measured illumination value to a comparator 504 through the illumination sensor 503, and may compare the measured illumination value and a pre-set threshold illumination value. According to the embodiment of the present disclosure, the electronic device may determine the threshold illumination value based on information of an average illumination value of the solar energy source and an average illumination value of the light energy source. In this case, the electronic device may perform the comparison with the threshold illumination value based on the illumination value information, and may perform charging according to the comparison result.

In operation 405, the electronic device may select a specific energy source.

For example, referring to FIG. 5, if the result of comparing the measured illumination value and the threshold illumination value through the comparator 504 shows that the measured illumination value is greater than or equal to a first threshold illumination value, i.e., 5000 Lux, the electronic device may determine that the electronic device is acquiring more solar energy sources than light energy sources at present, and thus may select the solar energy source. For another example, as shown in FIG. 5, if the result of comparing the measured illumination value and the threshold illumination value through the comparator 504 shows that the measured illumination value is less than or equal to a second threshold illumination value, i.e., 1000 Lux, the electronic device may determine that the electronic device is acquiring more light energy sources than solar energy sources at present, and thus may select the light energy source.

If the light energy source is selected, the electronic device may perform charging by using the light energy source in operation 407. For example, as shown in FIG. 5, if the result of comparing the illumination values shows that the light energy source is selected, the electronic device may control a controller 505 to open a path of the light energy source, and may allow the light energy source acquired through a device 502 capable of acquiring the light energy source to be used in battery charging of the electronic device or in a system operation of the electronic device through a regulator 506. Herein, the regulator 506 may be a charging IC for controlling an energy source to be used in the battery charging or to be used in the system operation of the electronic device. Although the regulator 506 is illustrated as one block in the present disclosure for convenience of explanation, the regulator 506 may be a block including a switch and a plurality of constitutional elements. In addition, according to the embodiment of the present disclosure, the regulator 506 may use a well-known MPPT algorithm to acquire energy.

If the solar energy source is selected, the electronic device may perform charging by using the solar energy source in operation 409. For example, as shown in FIG. 5, if the result of comparing the illumination values shows that the solar energy source is selected, the electronic device may control the controller 505 to open a path of the solar energy source, and may allow the solar energy source acquired through a device 501 capable of acquiring the solar energy source to be used in the battery charging of the electronic device or in the system operation of the electronic device through the regulator 506.

According to the embodiment of the present disclosure, the electronic device may allow charging based on a specific energy source to be on/off under a user control. For example, if a user of the electronic device intends to cut off charging based on the solar energy source, as shown in FIG. 5, the electronic device may control the controller 505 through a processor 507 included therein to cut off a path of the solar energy source. For another example, if the user of the electronic device intends to cut off charging based on the light energy source, as shown in FIG. 5, the electronic device may control the controller 505 through the processor 507 included therein to cut off a path of the light energy source.

Figure 6:
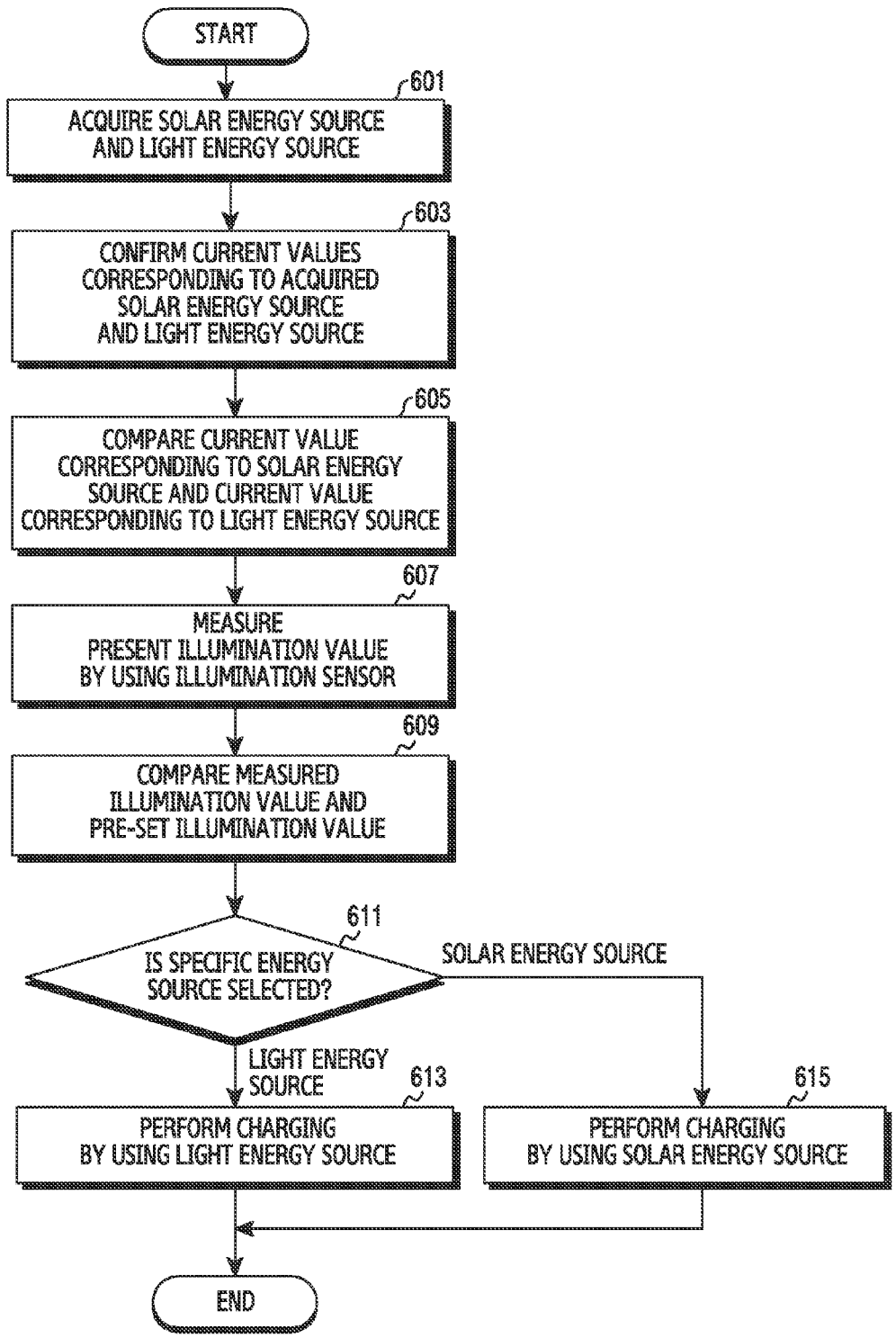
FIG. 6 illustrates a procedure of determining an energy source for charging an electronic device based on a current value for the energy source and an illumination value in the electronic device according to an embodiment of the present disclosure.
Figure 7:
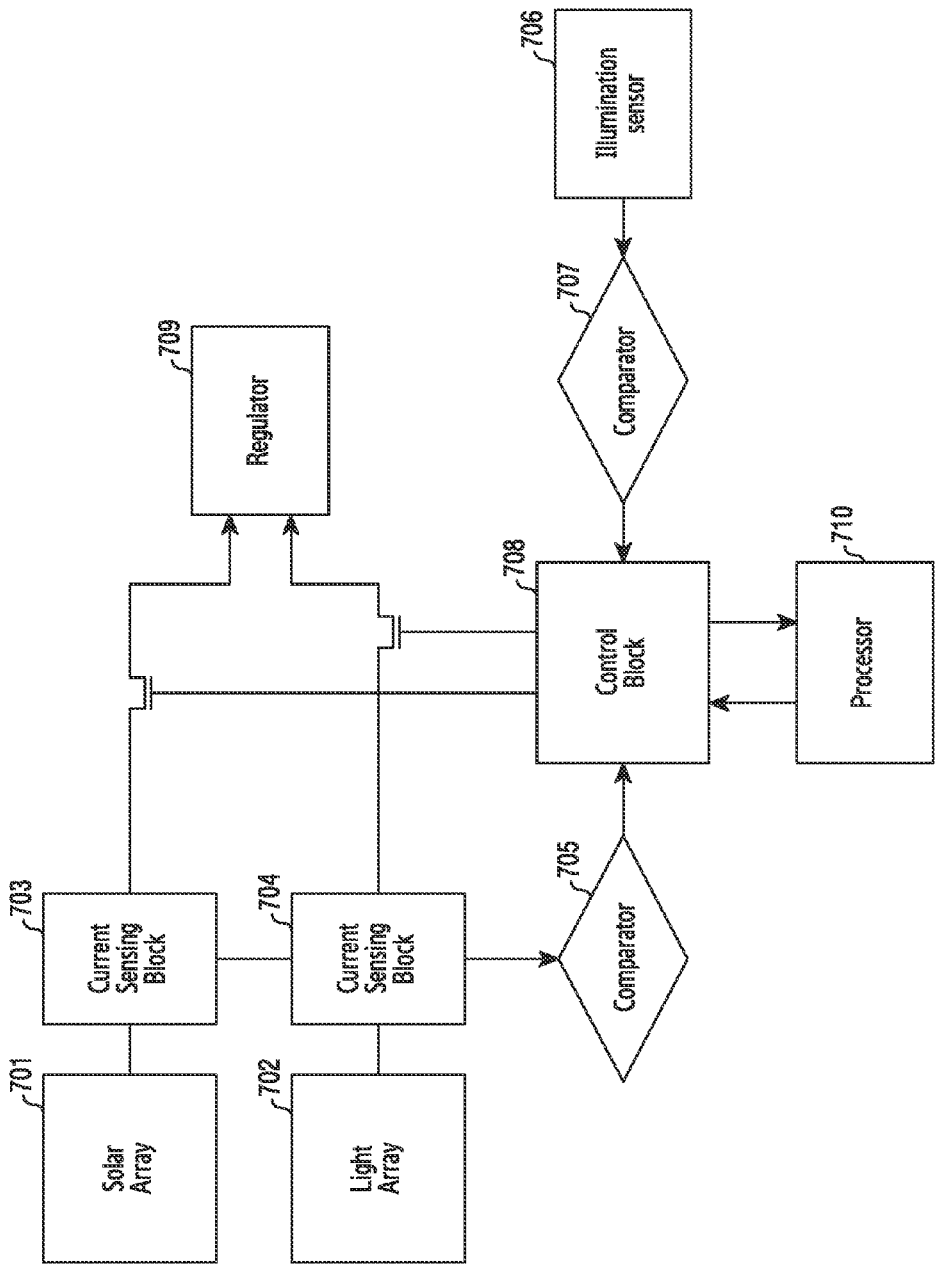
FIG. 7 illustrates a signal flow of determining an energy source for charging an electronic device based on a current value for the energy source and an illumination value in the electronic device according to an embodiment of the present disclosure.

FIG. 6 illustrates a procedure of determining an energy source for charging an electronic device based on a current value for the energy source and an illumination value in the electronic device according to an embodiment of the present disclosure. FIG. 7 illustrates a signal flow of determining an energy source for charging an electronic device based on a current value for the energy source and an illumination value in the electronic device according to an embodiment of the present disclosure.

Referring to FIGS. 6 and 7, the electronic device may acquire a solar energy source and a light energy source in operation 601. For example, as shown in FIG. 7, the electronic device may acquire the solar energy source and the light energy source respectively through a device 701 capable of acquiring the solar energy source and a device 702 capable of acquiring the light energy source.

In operation 603, the electronic device may confirm current values corresponding to the acquired solar energy source and light energy source.

For example, referring to FIG. 7, the electronic device may acquire current corresponding to the solar energy source and the light energy source through the device 701 capable of acquiring the solar energy source and the device 702 capable of acquiring the light energy source. In addition, as shown in FIG. 7, the electronic device may confirm a current value by detecting current corresponding to each energy source by using current sensors 703 and 704.

In operation 605, the electronic device may compare a current value corresponding to the solar energy source and a current value corresponding to the light energy source.

In addition, in operation 607, the electronic device may measure a present illumination value by using an illumination sensor. For example, as shown in FIG. 7, the electronic device may measure an ambient illumination value of the electronic device through an illumination sensor 706 included in the electronic device.

The aforementioned operations 601 and 607 may be performed at the same time point or at different time points. For example, the electronic device may perform the operations 601 and 607 at the same time point. For another example, the electronic device may perform the operation 601 before the operation 607. For another example, the electronic device may perform the operation 607 before the operation 601.

In operation 609, the electronic device may compare the measured illumination value and a pre-set illumination value.

In operation 611, the electronic device may select a specific energy source based on a current value and illumination value corresponding to the energy source. More specifically, if it is difficult to select the specific energy source by using only the current value corresponding to the energy source or if it is difficult to select the specific energy source by using only the illumination value, the electronic device may select the specific energy source by considering both of the current value and the illumination value. For example, as shown in FIG. 7, if the result of comparing the current values through a comparator 705 shows that both of the two current values are confirmed as a value (i.e., micro current) smaller than a threshold or both of the two current values are similar values and thus a specific energy cannot be selected, the electronic device may select the specific energy source based on the result of comparing the illumination results through a comparator 707. For another example, as shown in FIG. 7, if the result of comparing the illumination values through the comparator 707 shows that a measured illumination value is both of an illumination value indicated by the solar energy source and an illumination value indicated by the light energy source and thus a specific energy source cannot be selected, the electronic device may select the specific energy source based on the result of comparing the current values through the comparator 705.

If the light energy source is selected, the electronic device may perform charging by using the light energy source in operation 613. For example, as shown in FIG. 7, if the light energy source is selected, the electronic device may control a controller 708 to open a path of the light energy source, and may allow the light energy source to be used in battery charging of the electronic device or in a system operation of the electronic device through a regulator 709. Herein, the regulator 709 may be a charging IC for controlling an energy source to be used in the battery charging or to be used in the system operation of the electronic device. Although the regulator 709 is illustrated as one block in the present disclosure for convenience of explanation, the regulator 709 may be a block including a switch and a plurality of constitutional elements. In addition, according to the embodiment of the present disclosure, the regulator 709 may use a well-known MPPT algorithm to acquire energy.

If the solar energy source is selected, the electronic device may perform charging by using the solar energy source in operation 615. For example, as shown in FIG. 7, if the solar energy source is selected, the electronic device may control the controller 708 to open a path of the solar energy source, and may allow the solar energy source to be used in the battery charging of the electronic device or in the system operation of the electronic device through the regulator 709.

According to the embodiment of the present disclosure, the electronic device may allow charging based on a specific energy source to be on/off under a user control. For example, if a user of the electronic device intends to cut off charging based on the solar energy source, as shown in FIG. 7, the electronic device may control the controller 708 through a processor 710 included therein to cut off a path of the solar energy source. For another example, if the user of the electronic device intends to cut off charging based on the light energy source, as shown in FIG. 7, the electronic device may control the controller 708 through the processor 710 included therein to cut off a path of the light energy source.

Figure 8:
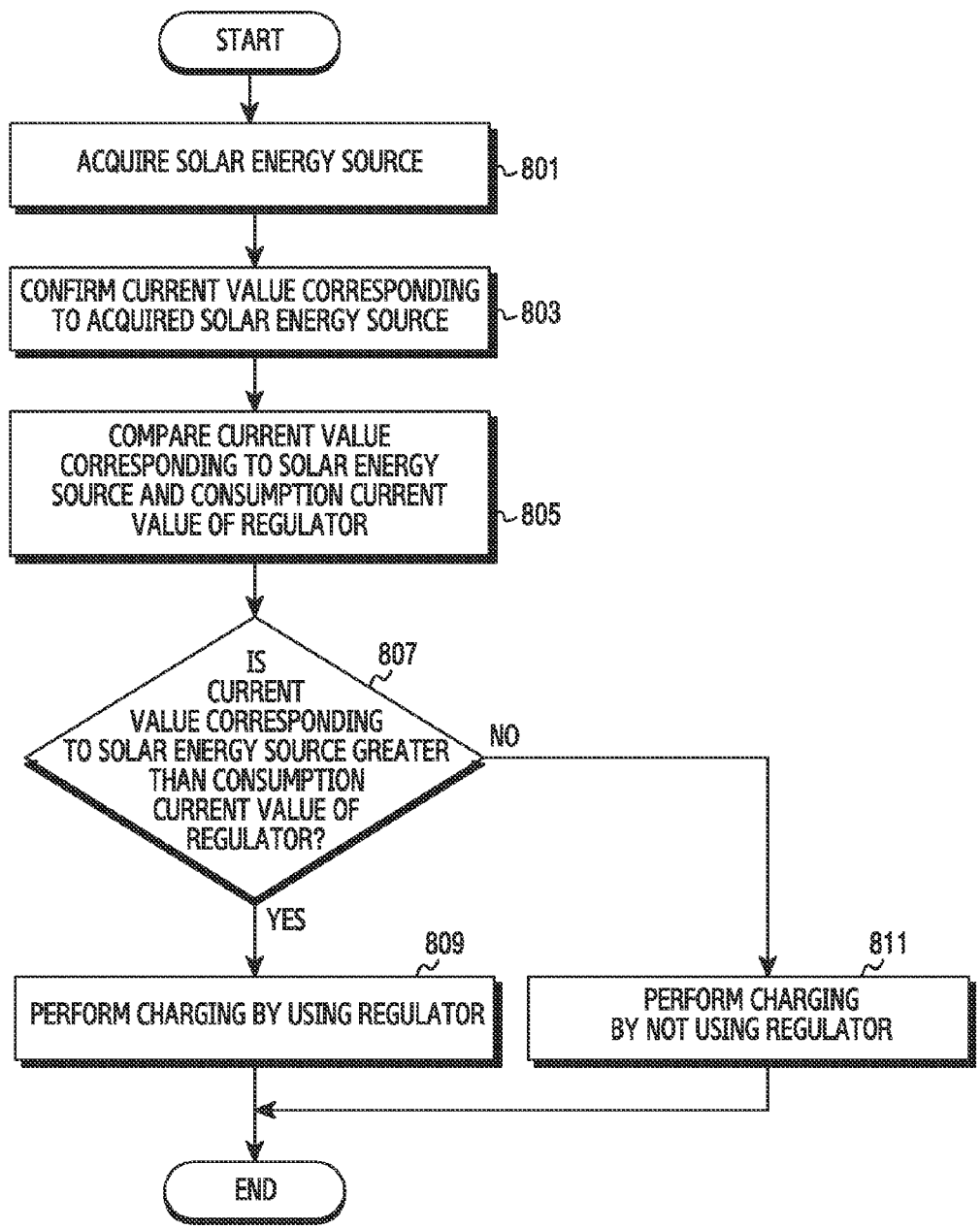
FIG. 8 illustrates a procedure of determining a charging mechanism of an electronic device based on a consumption current value of a regulator in the electronic device according to an embodiment of the present disclosure.
Figure 9:
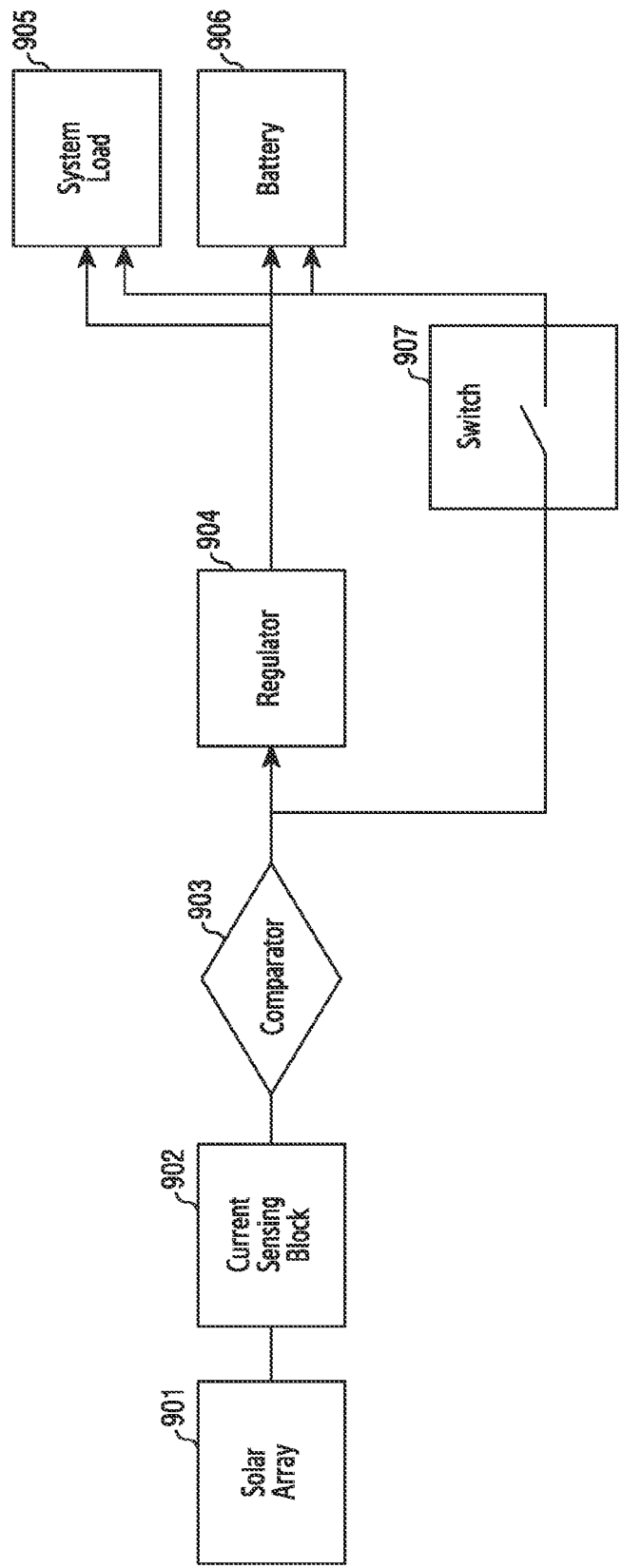
FIG. 9 illustrates a signal flow of determining a charging mechanism of an electronic device based on a consumption current value of a regulator in the electronic device according to an embodiment of the present disclosure.

FIG. 8 illustrates a procedure of determining a charging mechanism of an electronic device based on a consumption current value of a regulator in the electronic device according to an embodiment of the present disclosure. FIG. 9 illustrates a signal flow of determining a charging mechanism of an electronic device based on a consumption current value of a regulator in the electronic device according to an embodiment of the present disclosure.

Referring to FIGS. 8 and 9, the electronic device may acquire a solar energy source in operation 801.

For example, referring to FIG. 9, the electronic device may acquire each solar energy source through a device 901 capable of acquiring the solar energy source.

In operation 803, the electronic device may confirm a current value corresponding to the acquired solar energy source.

For example, as shown in FIG. 9, the electronic device may acquire current corresponding to the solar energy source through the device 901 capable of acquiring the solar energy source. In addition, as shown in FIG. 9, the electronic device may confirm a current value by detecting current corresponding to an energy source through a current sensor 902.

The electronic device may compare the current value corresponding to the solar energy source and a consumption current value of a regulator in operation 805, and may determine whether the current value corresponding to the solar energy source is greater than the consumption current value of the regulator in operation 807. For example, as shown in FIG. 9, the electronic device may compare the acquired solar energy source and the consumption current value of the regulator through a comparator 903, and may determine whether to perform charging by using the regulator or to perform charging by not using the regulator.

If the current value corresponding to the solar energy source is greater than the consumption current value of the regulator, the electronic device may perform the charging through the regulator in operation 809. For example, as shown in FIG. 9, the electronic device may compare the current value for the acquired solar energy source and a consumption current value of a regulator 904, and if a difference between the current value for the solar energy source and the consumption current value of the regulator 904 is out of a threshold range, the current of the acquired solar energy source may be provided to a system 905 or a battery 906 through the regulator 904. Herein, the regulator 904 may be a charging IC for controlling the energy source to be used in battery charging or for controlling the energy source to be used in a system operation of the electronic device. Although the regulator 904 is illustrated as one block in the present disclosure for convenience of explanation, the regulator 904 may be a block including a switch or a plurality of constitutional elements. In addition, according to the embodiment of the present, the regulator 904 may use a well-known MPPT algorithm to acquire energy.

If the current value corresponding to the solar energy source is less than the consumption current value of the regulator, the electronic device may perform charging by not using the regulator in operation 811. For example, as shown in FIG. 9, the electronic device may compare the current value for the acquired solar energy source and the consumption current value of the regulator 904, and if the difference between the current value for the solar energy source and the consumption current value of the regulator 904 is within the threshold range, may control a switch 907 to provide the current of the acquired solar energy source to the system 905 of the electronic device or the battery 906 of the electronic device by not using the regulator 904.

Figure 10:
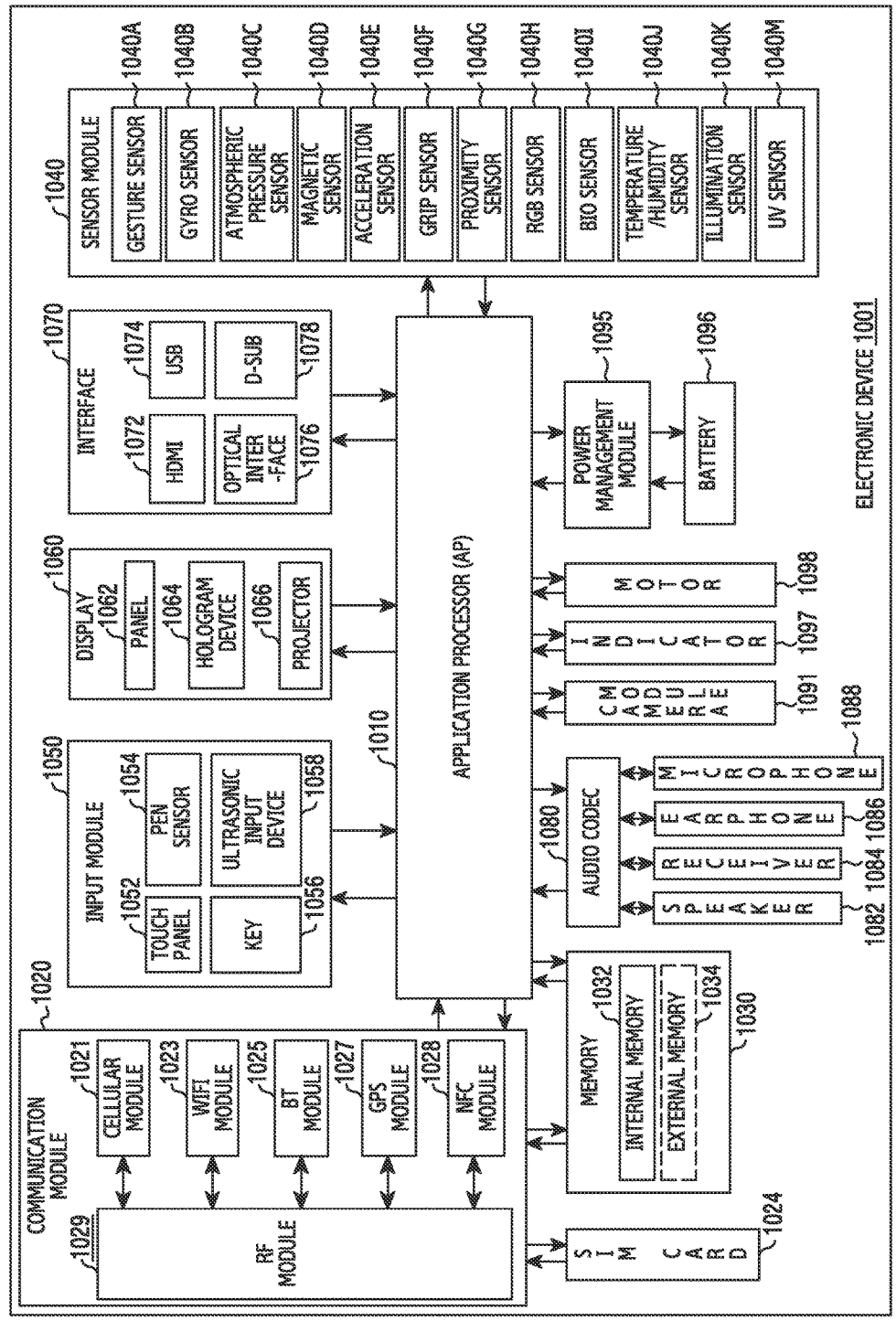
FIG. 10 is a block diagram of an electronic device according to an embodiment of the present disclosure.

FIG. 10 is a diagram illustrating an electronic device according to an embodiment of the present disclosure.

Referring to FIG. 10, an electronic device 1001 may include all or some of the components of the electronic device 101 illustrated in FIG. 1 and at least one AP 1010, a communication module 1020, a subscriber identification module (SIM) card 1024, a memory 1030, a sensor module 1040, an input unit 1050, a display 1060, an interface 1070, an audio module 1080, a camera module 1091, a power management module 1095, a battery 1096, an indicator 1097, or a motor 1098.

The AP 1010 drives an operating system (OS) or an application to control a plurality of hardware or software elements connected to the AP 1010 and performs various data processes including multimedia data and operations. The AP 1010 may be implemented, for example, as a system on chip (SoC). The AP 1010 may further include a graphics processing unit (GPU).

The communication module 1020 (e.g., the communication interface 380) may transmit and receive data in the communication between the electronic device 1001 (e.g., the electronic device 101) and other electronic devices (e.g., the server 201) connected over the network. The communication module 1020 may include a cellular module 1021, a WiFi module 1023, a BT module 1025, a GPS module 1027, an NFC module 1028, and a radio frequency (RF) module 1029.

The cellular module 1021 provides voice communication, image communication, a short message service, an internet service, and the like, through a communication network (e.g., LTE, LTE-A, CDMA, WCDMA, UMTS, WiBro, or GSM, and the like). In addition, the cellular module 1021 may perform discrimination and authentication of an electronic device within a communication network using, for example, a SIM (e.g., a SIM card 1024). The cellular module 1021 may perform at least a portion of functions that may be provided by the AP 1010. For example, the cellular module 1021 may perform at least part of a multimedia control function.

The cellular module 1021 may include a communication processor (CP). The cellular module 1021 may be implemented using, for example, an SoC. While the components of the cellular module 1021 (e.g., the CP), the memory 1030, and the power management module 1095 are separated from the AP 1010 in FIG. 10, the AP 1010 may include at least part (e.g., the cellular module 1021) of the above-stated components.

The AP 1010 or the cellular module 1021 (e.g., the CP) may load and process the instruction or the data received from its connected non-volatile memory or at least one of the other components, in a volatile memory. In addition, the AP 1010 or the cellular module 1021 may store data received from or generated by at least one of the other components, in the non-volatile memory.

Each of the WiFi module 1023, the BT module 1025, the GPS module 1027, or the NFC module 1028 may include, for example, a processor for processing data transmitted/received through a relevant module. While the cellular module 1021, the WiFi module 1023, the BT module 1025, the GPS module 1027, and the NFC module 1028 are separated from each other in FIG. 10, at least part (e.g., at least two) of the cellular module 1021, the WiFi module 1023, the BT module 1025, the GPS module 1027, and the NFC module 1028 may be included in a single integrated chip (IC) or an IC package. For example, at least part (e.g., the CP corresponding to the cellular module 1021 and the WiFi processor corresponding to the WiFi module 1023) of the processors corresponding to the cellular module 1021, the WiFi module 1023, the BT module 1025, the GPS module 1027, and the NFC module 1028 may be implemented using a single SoC.

The RF module 1029 may transmit and receive the data, for example, RF signals. The RF module 1029 may include, for example, a transceiver, a power amp module (PAM), a frequency filter, and a low noise amplifier (LNA), which are not shown. In addition, the RF module 1029 may further include a component, for example, a conductor or a conducting wire, for sending and receiving electromagnetic waves in free space during the wireless communication. While the cellular module 1021, the WiFi module 1023, the BT module 1025, the GPS module 1027, and the NFC module 1028 share the single RF module 1029 in FIG. 10, at least one of the cellular module 1021, the WiFi module 1023, the BT module 1025, the GPS module 1027, and the NFC module 1028 may transmit and receive the RF signals through a separate RF module.

The SIM card 1024 may be inserted into a slot formed in a specific position of the electronic device 1001. The SIM card 1024 may include unique identify information (e.g., integrated circuit card identifier (ICCID)) or subscriber information (e.g., international mobile subscriber identity (IMSI)).

The memory 1030 (e.g., the memory 150) includes a built-in memory 1032 or an external memory 1034. The built-in memory 1032 may include, for example, at least one of a volatile memory (e.g., a dynamic random access memory (DRAM), a static RAM (SRAM), a synchronous dynamic RAM (SDRAM)) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like).

The internal memory 1032 may be a solid state drive (SSD). The external memory 1034 may further include a flash drive, for example, compact flash (CF), secure digital (SD), micro-SD, mini-SD, extreme digital (xD), or a memory stick. The external memory 1034 may be functionally connected with the electronic device 1001 through various interfaces. The electronic device 1001 may further include a storage device (or a storage medium), such as a hard drive.

The sensor module 1040 measures a physical quantity or detects an operation state of the electronic device 1001 and converts the measured or detected information to an electric signal. The sensor module 1040 includes, for example, at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., red, green, blue (RGB) sensor), a living body sensor 1040I, a temperature/humidity sensor 1040J, an illumination sensor 1040K, or an ultra violet (UV) sensor 1040M. Additionally or alternatively, the sensor module 1040 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 1040 may further include a control circuit for controlling at least one sensor belonging thereto.

The input unit 1050 may include a touch panel 1052, a (digital) pen sensor 1054, a key 1056, or an ultrasonic input unit 1058. The touch panel 1052 recognizes a touch input using at least one of capacitive, resistive, infrared, or ultrasonic methods. In addition, the touch panel 1052 may further include a control circuit. A capacitive touch panel may perform detection by a physical contact or proximity recognition. The touch panel 1052 may further include a tactile layer. In this case, the touch panel 1052 may provide a tactile reaction to a user.

The (digital) pen sensor 1054 may be implemented using, for example, the same or similar method as or to the user's touch input, or using a separate recognition sheet. For example, the key 1056 may include, for example, a physical button, an optical key, or a keypad. The ultrasonic input device 1058 is a device capable of obtaining data by detecting microwaves through a microphone (e.g., a microphone 1088) in the electronic device 1001 through an input tool which generates an ultrasonic signal, allows RF identification. The electronic device 1001 may receive user input from an external device (e.g., a server or an Internet of things (IoT) device) connected using the communication module 1020.

The display 1060 (e.g., the display 170) includes a panel 1062, a hologram device 1064, or a projector 1066. The panel 1062 may be, for example, a liquid crystal display (LCD), or an active-matrix organic light-emitting diode (AM-OLED), and the like. The panel 1062 may be implemented, for example, such that the panel 1062 is flexible, transparent, wearable, and the like. The panel 1062 may be configured as one module together with the touch panel 1052. The hologram device 1064 may project a three-dimensional image in the air using interferences of light. The projector 1066 may project light onto a screen to display an image. The screen may be positioned, for example, inside or outside the electronic device 1001. The display 1060 may further include a control circuit for controlling the panel 1062, the hologram device 1064, or the projector 1066.

The interface 1070 includes, for example, a high-definition multimedia interface (HDMI) 1072, a universal serial bus (USB) 1074, an optical interface 1076, or a D-subminiature (D-sub) 1078. The interface 1070 may be included, for example, in the communication interface 180 illustrated in FIG. 1. Additionally or alternatively, the interface 1070 may include, for example, a mobile high-definition link (MHL)

interface, an SD card/multi-media card (MMC) interface, or an infrared data association (IrDA) standard interface.

The audio module 1080 may convert a sound and an electric signal in dual directions. At least a partial element of the audio module 1080 may be included, for example, in the I/O interface 160 illustrated in FIG. 1. The audio module 1080 processes sound information input or output through, for example, a speaker 1082, a receiver 1084, an earphone 1086, or the microphone 1088, and the like.

The camera module 1091 is a device that may capture a still image and a moving picture. The camera module 1091 may include at least one image sensor (e.g., a front sensor or a rear sensor), a lens, an image signal processor (ISP), or a flash (e.g., an LED or xenon lamp).

The power management module 1095 may manage power of the electronic device 1001. The power management module 1095 may include, although not depicted, for example, a power management integrated circuit (PMIC), a charger IC, or a battery or fuel gauge.

The PMIC may be mounted in, for example, an IC or an SoC conductor. The charging type may be divided to a wired type and a wireless type. The charger IC may charge the battery, and prevent overvoltage or overcurrent flow from the charger. The charger IC may include a charger IC for at least one of the wired charging type or the wireless charging type. The wireless charging type includes, for example, a magnetic resonance type, a magnetic induction type, and a microwave type, and may add an additional circuit for the wireless charging, for example, a circuit, such as a coil loop, a resonance circuit, a rectifier, and the like.

The battery gauge may, for example, measure the remaining capacity of the battery 1096 and the voltage, the current, or the temperature of the charging. The battery 1096 may store or generate electricity, and supply the power to the electronic device 1001 using the stored or generated electricity. The battery 1096 may include, for example, a rechargeable battery or a solar battery.

The indicator 1097 displays a specific state of the electronic device 1001 or a portion thereof (e.g., the AP 1010), for example, a booting state, a message state, a charging state, and the like. The motor 1098 converts an electric signal to mechanical vibration. The electronic device 1001 includes a processor (e.g., a GPU) for supporting a mobile TV. The processor for supporting the mobile TV may process media data corresponding to standards, for example, such as digital multimedia broadcasting (DMB), digital video broadcasting (DVB), a media flow, and the like.

Each of the aforementioned constitutional elements of the electronic device according to various embodiments of the present disclosure may consist of at least one component, and names thereof may vary depending on a type of electronic device. The electronic device according to various embodiments of the present disclosure may include at least one of the aforementioned constitutional elements. Some of the constitutional elements may be omitted, or additional other constitutional elements may be further included. In addition, some of the constitutional elements of the electronic device according to various embodiments of the present disclosure may be combined and constructed as one entity, so as to equally perform functions of corresponding constitutional elements before combination.

A terminology "module" used for the present disclosure may mean, for example, a unit including a combination of one or two or more among a hardware, a software, or a firmware. A "module" may be interchangeably used with a terminology such as a unit, a logic, a logical block, a component, or a circuit, and the like. A "module" may be a minimum unit of an integrally configured part or a portion thereof. A "module" may be a minimum unit performing at least one function or a portion thereof. A "module" may be mechanically or electronically implemented. For example, a "module" according to the present disclosure may include at least one of an application-specific integrated circuit (ASIC) chip, a field-programmable gate arrays (FPGAs), or a programmable-logic device which are known, or to be developed in the future, and performing certain operations.

At least part of the device (e.g., the modules or the functions) or the method (e.g., the operations) described in the appended claims and/or the specifications of the present disclosure may be implemented using, for example, instructions stored as the programming module in a non-transitory computer-readable storage medium. For example, when an instruction is executed by at least one processor (e.g., the processor 140), the at least one processor perform the corresponding function. The non-transitory computer-readable storage medium may be, for example, the memory 150. At least part of the programming module may be implemented (e.g., executed) by the processor 140. At least part of the programming module may include, for example, a module, a program, sets of instructions, or a process for performing at least one function.

According to an embodiment of the present disclosure, when a program is executed by an electronic device, there may be provided a computer-readable storage medium storing at least one program including instructions for allowing the electronic device to perform a method including acquiring different types of energy sources, determining an energy source for charging among the different types of energy sources based on respective current values for the different types of energy sources, and performing charging by using the determined charging energy source.

According to an embodiment of the present disclosure, when a program is executed by an electronic device, there may be provided a computer-readable storage medium storing at least one program including instructions for allowing the electronic device to perform a method including acquiring different types of energy sources, measuring an illumination value, determining an energy source for charging among the different types of energy sources based on the measured illumination value, and performing charging by using the determined energy source for charging.

According to an embodiment of the present disclosure, when a program is executed by an electronic device, there may be provided a computer-readable storage medium storing at least one program including instructions for allowing the electronic device to perform a method including acquiring an energy source, determining a first current value consumed in a regulator for performing a charging function, determining a second current value for the energy source and one path among a plurality of paths so that the energy source is used in battery charging of the electronic device or in a system operation of the electronic device based on the second current value, and allowing the energy source to be used in the battery charging of the electronic device or in the system operation of the electronic device through the determined path, wherein the plurality of paths includes a first path having the regulator and a second path not having the regulator.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or programming module, according to various embodiments of the present disclosure, may include at least one of the above-described elements, may omit some elements, or may further include additional elements. The operations performed by the module, the programming module, or the other elements, according to various embodiments of the present disclosure, may be performed serially, in parallel, repeatedly, or heuristically. In addition, some operation may be performed in different order or may be omitted, and additional other operations may be added.

According to various embodiments of the present disclosure, in a storage medium for storing instructions, when the instructions are executed by at least one processor, the at least one processor may be allowed to perform at least one operation. The at least one operation may include acquiring different types of energy sources in an electronic device, determining an energy source for charging among the different types of energy sources based on respective current values for the different types of energy sources, and allowing the determined energy source for charging so as to be used in battery charging of the electronic device or in a system operation of the electronic device.

According to various embodiments of the present disclosure, in a storage medium for storing instructions, when the instructions are executed by at least one processor, the at least one processor may be allowed to perform at least one operation. The at least one operation may include acquiring an energy source in an electronic device, determining a first current value consumed in a regulator for performing a charging function, determining a second current value for the energy source and one path among a plurality of paths so that the energy source is used in battery charging of the electronic device or in a system operation of the electronic device based on the second current value, and allowing the energy source to be used in the battery charging of the electronic device or in the system operation of the electronic device through the determined path, wherein the plurality of paths includes a first path having the regulator and a second path not having the regulator.

According to the present disclosure, an electronic device acquires different types of energy sources, determines an energy source for charging based on a current value and/or illumination value corresponding to the acquired energy sources, and thereafter allows current for the determined energy source for charging to be used for battery charging of the electronic device or for a system operation of the electronic device. Therefore, an energy source having a high charging efficiency among the different types of energy sources can be used for the battery charging of the electronic device or for the system operation of the electronic device.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:
1. An electronic device comprising:
  a battery;
  an illumination sensor;
  a first energy acquisition circuit configured to acquire a solar energy source;
  a second energy acquisition circuit configured to acquire a light energy source;
  a first current sensor configured to identify a first current value corresponding to the solar energy source acquired through the first energy acquisition circuit;
  a second current sensor configured to identify a second current value corresponding to the light energy source acquired through the second energy acquisition circuit; and
  a processor configured to:
    upon determining that the first current value is greater than the second current value, select the solar energy source as an energy source to be used for charging the battery, and charge the battery using the solar energy source acquired through the first energy acquisition circuit,
    upon determining that the second current value is greater than the first current value, select the light energy source as the energy source to be used for charging the battery, and charge the battery using the light energy source acquired through the second energy acquisition circuit,
    upon determining that the first current value and the second current value are equal, identify an illumination level via the illumination sensor,
    upon determining that the illumination level is greater than a reference level, select the solar energy source as the energy source to be used for charging the battery, and charge the battery using the solar energy source acquired through the first energy acquisition circuit, and
    upon determining that the illumination level is less than the reference level, select the light energy source as the energy source to be used for charging the battery, and charge the battery using the light energy source acquired through the second energy acquisition circuit.

2. A method of an electronic device, the method comprising:

acquiring a solar energy source via a first energy acquisition circuit;

acquiring a light energy source via a second energy acquisition circuit;

upon determining that the first current value is greater than the second current value, selecting the solar energy source as an energy source to be used for charging the battery, and charging a battery of the electronic device using the solar energy source acquired through the first energy acquisition circuit;

upon determining that the second current value is greater than the first current value, selecting the light energy source as the energy source to be used for charging the battery, and charging the battery using the light energy source acquired through the second energy acquisition circuit;

upon determining that the first current value and the second current value are equal, identifying an illumination level via the illumination sensor;

upon determining that the illumination level is greater than a reference level, selecting the solar energy source as the energy source to be used for charging the battery, and charging the battery using the solar energy source acquired through the first energy acquisition circuit; and upon determining that the illumination level is less than the reference level, selecting the light energy source as the energy source to be used for charging the battery, and charging the battery using the light energy source acquired through the second energy acquisition circuit.

* * * * *